United States Patent
Carbol et al.

(10) Patent No.: US 10,264,057 B2
(45) Date of Patent: Apr. 16, 2019

(54) HYBRID CLOUD INTEGRATION SYSTEMS AND METHODS

(71) Applicant: SAP SE, Walldorf (DE)

(72) Inventors: Gunilla Carbol, Leopoldshafen (DE); Gisella Dominguez Anzuinelli, Sankt Leon-Rot (DE); Matthias Richter, Sinsheim (DE); Mathias Schoenecker, Hambrücken (DE); Heiko Zimmermann, Waghäusel (DE); Bob Cummings, Shakopee, WA (US); Todd Carmichael, Bellevue, WA (US); Richard Boulton, Bellevue, WA (US); Aneetha Dorairaj, Issaquah, WA (US)

(73) Assignee: SAP SE, Walldorf (DE)

( * ) Notice: Subject to any disclaimer, the term of this patent is extended or adjusted under 35 U.S.C. 154(b) by 228 days.

(21) Appl. No.: 15/373,358

(22) Filed: Dec. 8, 2016

(65) Prior Publication Data
US 2018/0167443 A1   Jun. 14, 2018

(51) Int. Cl.
*G06F 15/16* (2006.01)
*H04L 29/08* (2006.01)
*G06F 17/30* (2006.01)

(52) U.S. Cl.
CPC ........ *H04L 67/10* (2013.01); *G06F 17/30011* (2013.01); *G06F 17/30312* (2013.01); *H04L 67/02* (2013.01); *H04L 67/06* (2013.01)

(58) Field of Classification Search
None
See application file for complete search history.

(56) References Cited

U.S. PATENT DOCUMENTS

| | | | |
|---|---|---|---|
| 7,974,892 B2 | 7/2011 | Fredericks et al. | |
| 8,140,361 B2 | 3/2012 | Fredericks et al. | |
| 8,234,338 B1* | 7/2012 | Dagum ................... | H04L 51/30 709/201 |
| 8,719,225 B1* | 5/2014 | Rath ................. | G06F 17/30578 707/634 |
| 8,892,687 B1* | 11/2014 | Call .................. | H04L 29/06972 709/217 |
| 9,087,020 B1* | 7/2015 | Amacker .............. | G06F 15/167 |
| 9,208,528 B2 | 12/2015 | Chelst et al. | |
| 9,959,584 B1* | 5/2018 | Frank ..................... | G06Q 50/24 |
| 10,027,628 B2* | 7/2018 | Call .................. | H04L 29/06972 |
| 2002/0007374 A1* | 1/2002 | Marks .................... | H04L 12/18 709/203 |
| 2002/0057678 A1* | 5/2002 | Jiang ...................... | H04L 12/66 370/353 |

(Continued)

*Primary Examiner* — Phyllis A Book
(74) *Attorney, Agent, or Firm* — Fountainhead Law Group P.C.

(57) ABSTRACT

In one embodiment, first and second computer systems are integrated to exchange information and coordinate processing of data. A first computer system may access data in a database for a document ready for external processing. The data may be stored in a queue and retrieved by the second system using a request. The second system sends an acknowledgement when the data is received. The data in the queue may be locked until a confirmation is received in the first system that processing on the second system is complete. In particular embodiments, the first system may be a cloud computer system and the second system a backend computer system.

20 Claims, 7 Drawing Sheets

(56) References Cited

U.S. PATENT DOCUMENTS

| | | | |
|---|---|---|---|
| 2002/0147839 A1* | 10/2002 | Boucher | H04L 29/06 709/238 |
| 2004/0002876 A1 | 1/2004 | Sommers et al. | |
| 2004/0083134 A1 | 4/2004 | Spero et al. | |
| 2005/0015272 A1 | 1/2005 | Wind et al. | |
| 2008/0098406 A1* | 4/2008 | Quick | G06Q 10/107 719/314 |
| 2009/0012943 A1* | 1/2009 | Sattler | G06F 17/2247 |
| 2011/0161349 A1* | 6/2011 | Ireland | G06F 17/30575 707/769 |
| 2011/0258630 A1* | 10/2011 | Fee | G06F 9/4843 718/101 |
| 2012/0123913 A1 | 5/2012 | Sreesha | |
| 2013/0044583 A1* | 2/2013 | Chuang | G06F 17/30398 370/216 |
| 2014/0201838 A1* | 7/2014 | Varsanyi | G06F 21/552 726/23 |
| 2014/0214656 A1* | 7/2014 | Williams | G06Q 20/223 705/39 |
| 2014/0289644 A1* | 9/2014 | Clarke | H04L 51/34 715/752 |
| 2014/0344300 A1* | 11/2014 | Garcia | G06F 17/30312 707/758 |
| 2015/0012442 A1* | 1/2015 | Ceribelli | G06Q 20/1085 705/45 |
| 2015/0134600 A1* | 5/2015 | Eisner | G06F 17/30011 707/608 |
| 2015/0341280 A1* | 11/2015 | Wang | H04L 47/56 709/225 |
| 2017/0279928 A1* | 9/2017 | Mokeev | G06F 9/541 |

* cited by examiner

HYBRID CLOUD INTEGRATION SYSTEMS AND METHODS

BACKGROUND

The present disclosure relates to computer systems, and in particular, to integrating cloud computer systems with backend computer systems.

Cloud computing refers to the practice of using a network of remote servers hosted on the Internet to store, manage, and process data, rather than a local server or a personal computer. One challenge with the adoption of cloud computer systems is that many existing software platforms are often required to interact with software running on a cloud platform. Such existing software running on local servers are often referred to as "legacy systems." Software systems that include both software running on a cloud platform and software running on a local server are referred to as "hybrid" systems (e.g., both "cloud" and "local").

Software providers typically want to provide a user with a seamless experience so that the user may not know if software is running in the cloud, locally on a legacy system, or both. Integrating cloud software with legacy software refers to the software mechanisms created to allow a cloud system and legacy or backend system to work together. Unfortunately, cloud software systems and legacy backend systems may be operating in substantially different computing environments using different technologies, different data formats, different process flows, and representing information in different ways, for example. One particular problem pertains to moving data between systems. If a backend system runs queries against a cloud transactional database, the cloud database performance may degrade, which may adversely impact the user experience by slowing down the cloud system. Additionally, when data is moved to a backend system for processing, the cloud system may not know if the backend system encounters errors with the data. Yet further, accessing functionality of the cloud system from the backend may require a large amount of burdensome application program interfaces (APIs), which can be difficult to manage on the backend. These are just a few example challenges. Accordingly, integration of cloud and backend systems is an important challenge facing computer software developers.

SUMMARY

The present disclosure pertains to hybrid cloud integration systems and methods. In one embodiment, first and second computer systems are integrated to exchange information and coordinate processing of data. A first computer system may access data in a database for a document ready for external processing. The data may be stored in a queue and retrieved by the second system using a request. The second system sends an acknowledgement when the data is received. The data in the queue may be locked until a confirmation is received in the first system that processing on the second system is complete. In particular embodiments, the first system may be a cloud computer system and the second system a backend computer system.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
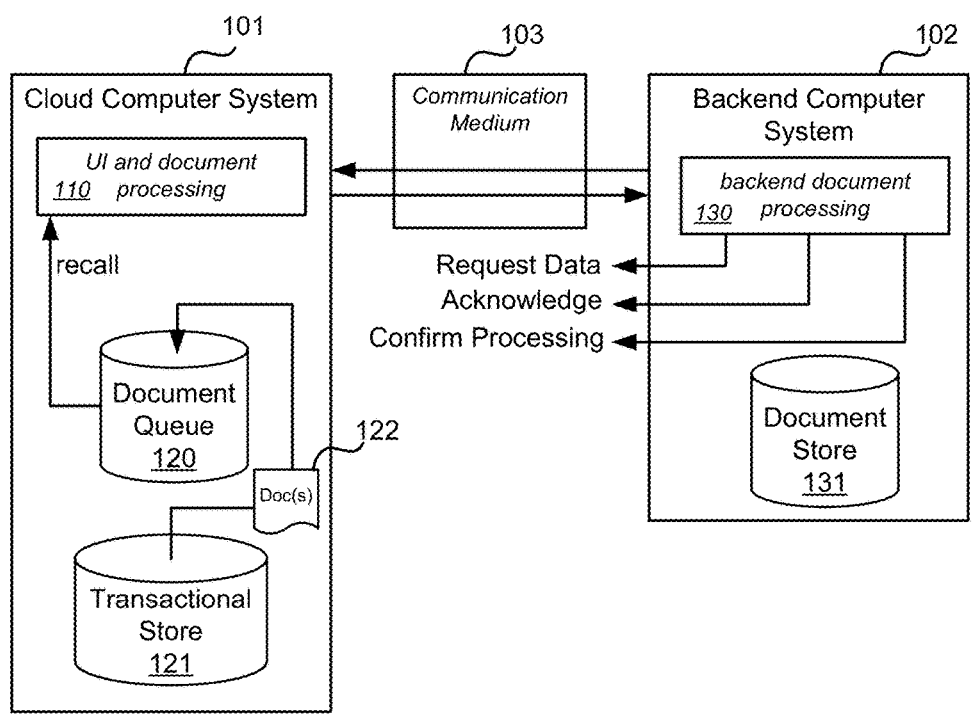
FIG. 1 illustrates a cloud computer system and backend system according to an embodiment.

FIG. 1 illustrates a cloud computer system and backend system according to an embodiment. Features and advantages of the present disclosure include methods and software techniques, executable on a computer system, for integrating a cloud computer system's software with a backend computer system's software. Referring to FIG. 1, cloud computer system 101 may include user interface software (UI) and other functional software 110, which may include document/data processing. Cloud computer system software typically provides direct user access over the Internet as well as backend cloud processing for many users, for example. However, many organizations may also have backend computer systems running legacy software. For a variety of reasons, some users and/or organizations prefer to have some computers and software executing on their own proprietary hardware and/or software. Such computer systems are referred herein as "backend computer systems" 102 and may include servers owned by a user or organization, housed and operated on the user or organization's premises (sometimes referred to as "on prem"). As illustrated in FIG. 1, backend computer system 102 may execute backend document processing software 130 and one or more databases 131, for example. The backend computer system 102 and backend software 130 may be coupled to the cloud computer system and cloud software 110 over a communication medium 103, which may include the Internet and/or a variety of other networks, for example. Such cloud-backend implementations are sometimes referred to as "hybrid cloud" systems (or herein just, "hybrid"), for example.

As cloud computing has grown in popularity in recently years, it has been important for the expanding functionality of cloud software to integrate with on-prem backend software, such as legacy enterprise resource planning (ERP) software, for example. In one embodiment, integration may include a feedback loop between the cloud computer system 101 and backend computer system 102 to facilitate the near real time exchange of transactional data between cloud software and backend software for purposes of integration. The result of any backend processing of cloud data (success or error) may be immediately be returned to the cloud system. Thus, error messages on the backend may be quickly and simply reported to the cloud so that the cloud software can react seamlessly to the needs of the backend software.

In one embodiment, hybrid cloud-backend integration may include a request message (e.g., Request Data in FIG. 1), an acknowledgement message (e.g. Acknowledge in FIG. 1), and a confirmation message (e.g., Confirm Processing in FIG. 1) between the backend computer system and the cloud computer system. The request may retrieve data associated with one or more documents from the first computer system to the second computer system. The acknowledgement may indicate that the data associated with the document(s) was received on the backend computer system, for example. The confirmation may indicate a status of one or more processing steps being performed on the document on the backend. In one embodiment, data associated with the document cannot be recalled for certain processing once the acknowledgement message has been received until after the status confirmation message indicates that the one or more processing steps on the backend have been successfully or unsuccessfully completed, for example. One advantage of such an approach is that if a process on the cloud computer system is related to a process on the backend computer system, then once a document is ready for backend processing (e.g., the cloud side process is deemed to have been completed), the document can be blocked from recall or otherwise locked down after the document is received by the backend (e.g., and not before) until the backend computer system indicates it has completed its' processing steps, for example.

As mentioned above, another problem with hybrid cloud systems is that the performance of transactional databases on the cloud computer system may be adversely impacted when the backend computer system needs to access or change data, for example. In one embodiment, cloud computer system 101 may include one or more transactional databases 121 to store data associated with cloud application software 110 as well as a document queue 120 to store data associated with documents 122. Advantageously, backend computer system 102 may access data from document queue 120 rather than directly from transactional database 121 so that the performance of database 121 is not degraded. For example, in one embodiment, data associated with a document may be stored in a plurality of tables in a transactional database. Accordingly, cloud computer system software may access data associated with one or more documents (e.g., documents ready for external processing) and store the data associated with each document together in a queue. Accordingly, rather than having data for different documents stored disparately across numerous tables, some embodiments may advantageously gather some or all of the data for a particular document and store it together in document queue 120. In one embodiment, data associated with a document may be stored together in a JSON object, for example. JSON (or JavaScript Object Notation) is a lightweight data-interchange format that is easy for humans to read and write and easy for machines to parse and generate. JSON is based on a subset of the JavaScript Programming Language.

Features and advantages of the present disclosure include limiting recall of documents in the queue so the status of the document in the backend system processing is known before the document is recalled from the queue for additional processing. For example, as soon as a document (e.g., and expense report, a cash advance, or an invoice) is ready for processing by the backend, it will be sent to queue 120 where it waits to be processed by the backend. A document on the cloud side may be recalled for further processing as long the cloud document is not retrieved from the queue by the backend system. Once the document is acknowledged by the backend system as having been retrieved, the document cannot be recalled, and the cloud system must wait for the confirmation message for this document to be sent by the backend system. The confirmation can be a success message which informs the cloud system that the document has been successfully processed (e.g., posted into a backend financial system). In one embodiment, the document may be recalled if the confirmation indicates the one or more processing steps on the backend computer system have been unsuccessfully completed. For example, if the confirmation indicates an error has occurred on the backend (or the backend processing was otherwise unsuccessful), it is then possible to recall the document in the cloud system after error confirmation to correct the error in the document and resend it to the queue for backend processing. Using the techniques described herein, there is a clear segregation of duties between the cloud and backend systems. The backend computer system is responsible for specific processing functions (e.g., posting into a financial system), but major interaction with the cloud system may be triggered by the cloud computer system storing documents in the queue. The request, acknowledge, and confirmation signals inform the cloud computing system of the status of the backend processing. Other than blocking recall from the queue and further processing of the document for a time between the acknowledgement and confirmation, the cloud and backend systems may advantageously operate independently and asynchronously.

Figure 2:
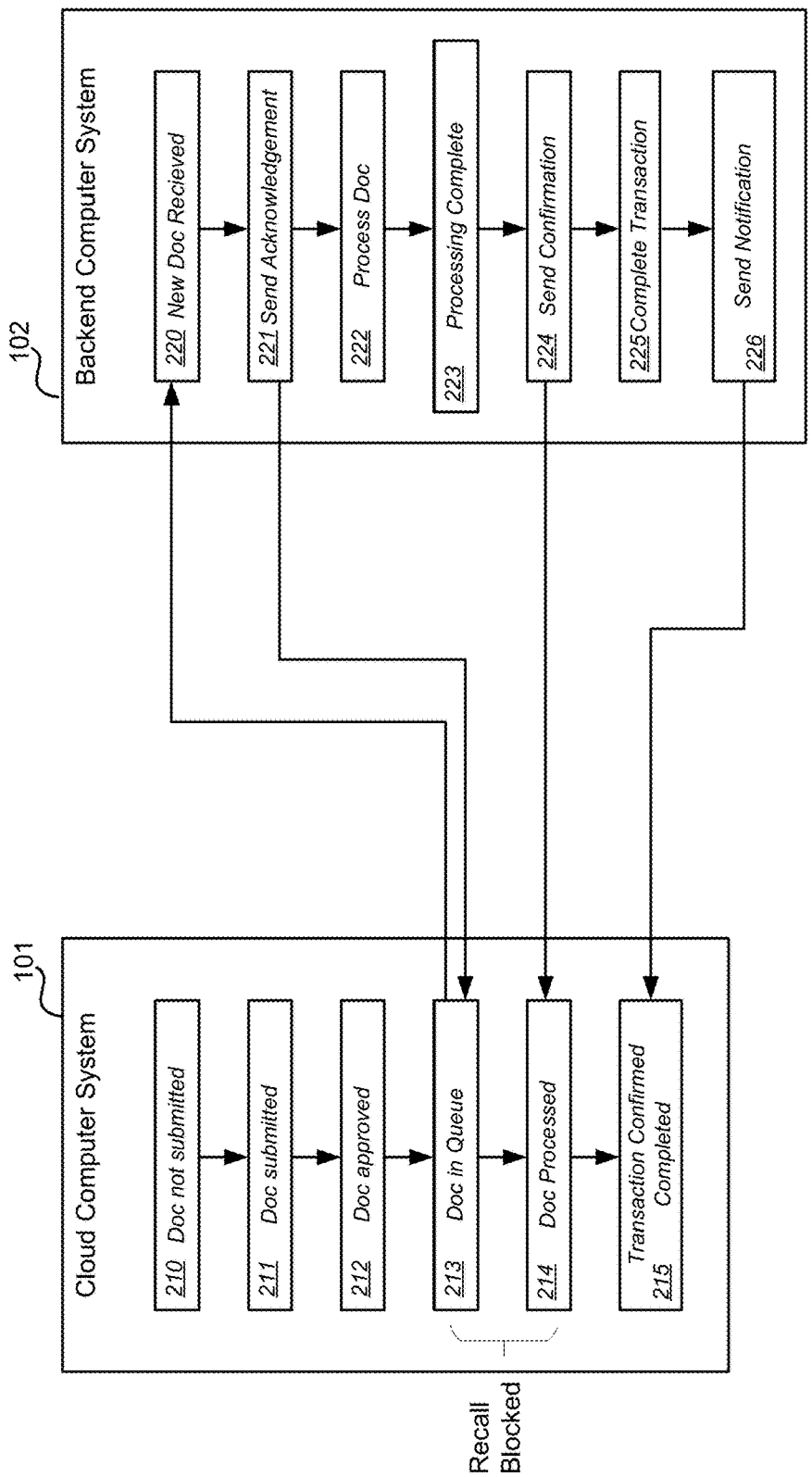
FIG. 2 illustrates a feedback loop between the cloud computer system and backend system according to an embodiment.

FIG. 2 illustrates a feedback loop between the cloud computer system and backend system according to an embodiment. In one embodiment, a document on cloud computer system 101 may be created and filled with data, for example. During document creation, the document is not submitted or available for external processing 210. At some point, a document may be ready for external processing. For example, and expense report, invoice, or cash advance request may be fully filled with the required data and approved for processing. At 211, the document is submitted and at 212 the document is approved. Once approved, the document data may be stored in a queue at 213, for example. On the backend computer system 102, periodic retrievals of document data may occur automatically. For example, backend software running on the backend computer may produce a REST GET instruction in a HTTP message, and documents in the queue are returned. In one embodiment described in more detail below, a document type and optional document identification are included in the GET instruction and only documents of a certain type are returned (e.g., type=expense report, type=invoice, type=cash advance). When the documents are received in backend 102, an acknowledgement message is sent at 221. Accordingly, cloud system 101 is informed of the status of the documents in the queue. For example, an acknowledgement may be a POST instruction in an HTTP message as also described below. After the acknowledgement is sent by backend 102, the document is processed at 222. Processing may include posting the expense report, invoice, or cash advance to a backend financial system, for example. Backend processing of the document is completed at 223 and a confirmation is sent at 224. The confirmation may be sent at 224. In one embodiment, the confirmation may be a POST instruction in an HTTP message also described below. The confirmation is received in cloud system 101 at 214. Between the acknowledgement and the confirmation, the document may not be recalled from the queue (e.g., the recall is blocked). In another embodiment, the backend 102 may go on to perform one or more additional transactions (e.g., payment of an expense report, invoice, or cash advance) based on the retrieved document at 225 and send notifications to the cloud system 101 that such transactions are completed at 226. The cloud system may record such notifications at 215, for example. Accordingly, separate workflows on the cloud and backend may stay in sync even though the systems are running semi-independently and asynchronously.

Figure 3:
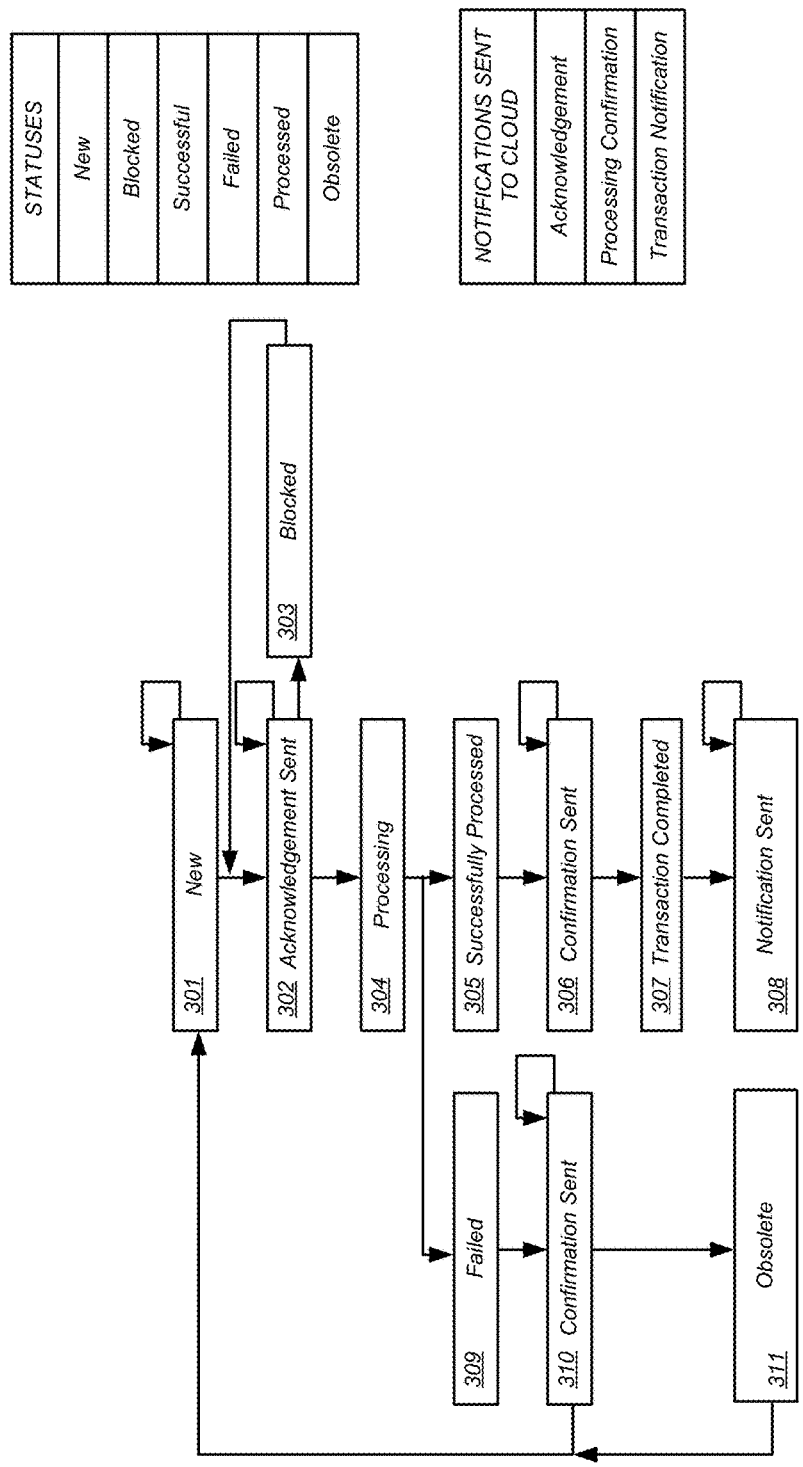
FIG. 3 illustrates a document status flow diagram according to an embodiment.

FIG. 3 illustrates a document status flow diagram according to an embodiment. In some embodiments, a document may be assigned a status, and the status may change as the document is processed by the system. As illustrated by the following example, the status of a document may change between predefined states in a defined sequence where the next status in the sequence is defined by the current status (e.g., a state diagram). For instance, in one embodiment the backend system may receive a document and assign the document a status of "New" at 301. After a successful acknowledgement has been sent at 302 the document status may be set to "Acknowledgement Sent" and may be processed. If the acknowledgement is blocked or otherwise unsuccessful, the status is changed to "Blocked" at 303. When processing begins, the document status may be set to "Processing" at 304. If the processing is successful, the status is set to "Successfully Processed" at 305. If processing fails or is otherwise unsuccessful, the status is set to "Failed" at 309. From a "Successfully Processed" status, the status may be set to "Confirmation Sent" at 306 after a confirmation is sent from the backend to the cloud system. If additional transactions occur using the document, then the status can sequentially move from "Transaction Completed" at 307 and "Notification Sent" at 308. From a "Failed" status, the status may sequentially change to "Confirmation Sent" at 310 when a confirmation of the failure is sent from the backend to the cloud system. From statuses 309 and 310, the status may transition back to "New". In some embodiments, if document processing fails multiple times, the document may be assigned a status of "Obsolete" at 311, for example.

Figure 4:
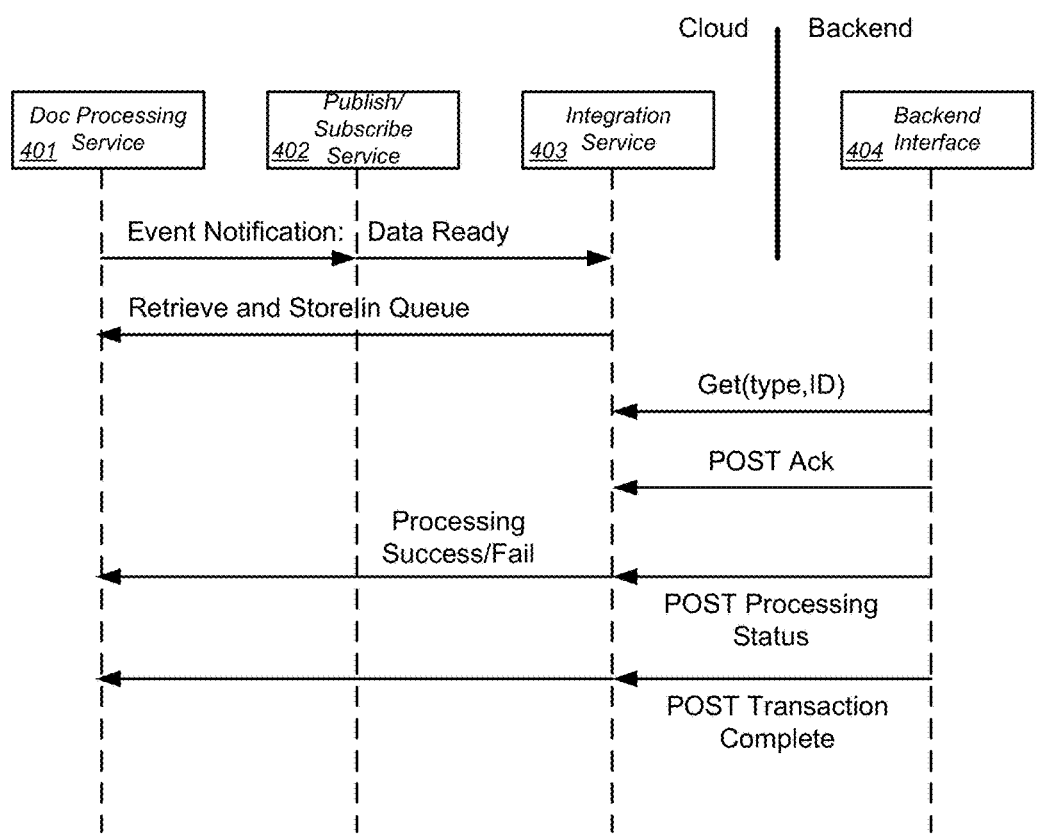
FIG. 4 illustrates a communication flow diagram according to an embodiment.

FIG. 4 illustrates a communication flow diagram according to an embodiment. In this example, cloud computer system may include a document processing service 401 (e.g., application logic), a publish/subscribe ("Pub/Sub") service 402 (e.g., a communication bus), and an integration service 403. Document processing service 401 may, for example, include a software defined workflow for generating and receiving approval for a document (e.g., a financial document such as an expense report, invoice, or cash advance). Once the document is approved, or when a document associated with a particular transaction is otherwise specified as approved for external processing, an event notification is sent to the Pub/Sub service 402. The Pub/Sub service may be subscribed to by a variety of services and software components in the cloud software system. Typically, the subscribers are notified when particular events are published. In this example, integration service 403 subscribes to the Pub/Sub service for document approvals. Accordingly, integration service 403 receives an event notification that a document and related data has been approved and is ready for backend processing.

Integration service 403 may access the data associated with the approved document by generating queries, for example, against the transactional database. Accordingly, integration service 403 retrieves and stores the data associated with each document in the queue. In this example, the data associated with each document is retrieved, potentially from many database tables, and stored together as a JSON object, for example. At some later time, backend interface 404 may retrieve the data from the queue. For example, asynchronously from the storing performed by the integration service 403, the cloud system may receive a REST HTTP GET request, for example, for the document. Accordingly, any JSON objects in the queue are retrieved from the cloud computer system to the backend computer system in response to the GET request.

REST refers to representational state transfer (REST) or RESTful web services, which are one way of providing interoperability between computer systems on the internet. REST-compliant web services allow requesting systems to access and manipulate textual representations of web resources using a uniform and predefined set of stateless operations. In a REST web service, requests made to a resource's URI will elicit a response that may be in XML, HTML, JSON or some other defined format. The response may confirm that some alteration has been made to the stored resource, and it may provide hypertext links to other related resources or collections of resources. Using HTTP, as is most common, the kind of operations available include those predefined by the HTTP methods GET, POST, PUT, DELETE and so on. By making use of a stateless protocol and standard operations REST systems aim for fast performance, reliability, and the ability to grow, by using reusable components that can be managed and updated without affecting the system as a whole, even while it is running.

Features and advantages of the present disclosure include a technique for simplifying and streamlining the data retrieval process. In some cases, many APIs are used to access data and functions in cloud platforms, which can be burdensome and confusing for system integrators. In one embodiment, when integration service 403 retrieves data associated with a document ready for external processing, a document type is appended to the document (e.g., a document type field is included in the JSON object). In some embodiments, document identifications (IDs) may also be included in the JSON object. Additionally, the data request from the backend computer system 404 (e.g., the GET request) may include a document type, and may further include a document ID. Accordingly, in response to the request a plurality of documents (e.g., JSON objects) in the queue having the specified document type are returned to the backend computer system in response to the request. Accordingly, the backend computer system may retrieve only specified document types (e.g., in batches) for specified backend processing tasks.

In this example, when the documents is received on the backend, the integration service on the cloud system receives, from the backend computer system, a first REST HTTP POST acknowledging that the JSON object was received. As mentioned above, in some embodiments the JSON object cannot be recalled from the queue once the first POST has been received. Backend interface 404 may forward the document for processing on the backend system. When processing has completed, successfully or unsuccessfully, the integration service on the cloud system receives, from the backend computer system, a second REST HTTP POST indicating a status of one or more processing steps being performed on the document (e.g., successfully processed or failed). Integration service 403 may relay the status back to document processing service 401, for example. After the second POST, the JSON object may be recalled by the cloud system application, for example. In one embodiment, additional transactions on the backend system may trigger additional POST notifications being sent to the integration service on the cloud system when such transactions are completed. These notifications may likewise be relayed back to the cloud application to keep the cloud application in sync with activities on the backend. For example, in one embodiment, when a expense report, invoice, or cash advance are paid by the backend system, a notification is sent to the cloud system, and the cloud system may use such information in a variety of ways, for example.

Figure 5:
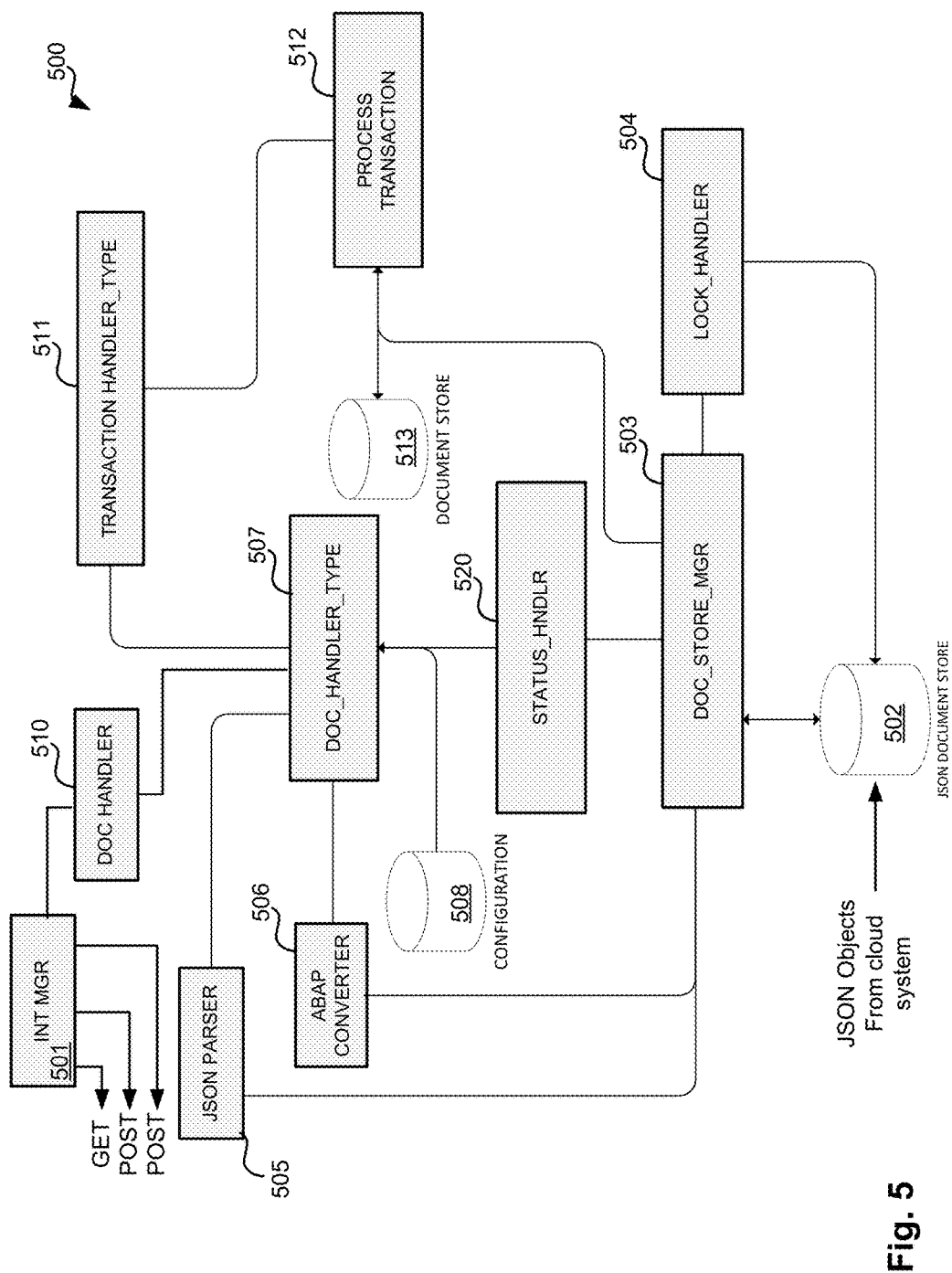
FIG. 5 illustrates an example backend architecture for processing documents from a cloud computer system according to an embodiment.

FIG. 5 illustrates an example backend architecture for processing documents from a cloud computer system according to an embodiment. The blocks shown in FIG. 5 represent a pseudo-class diagram for implementing a backend system to process documents from the cloud system. Accordingly, in some example implementations each block may correspond to one or more classes and one or more corresponding objects for processing data, for example. Backend computer system software 500 may include an integration manager ("INT MGR") 501. Backend system may schedule retrieval of documents from the cloud system queue at predefined intervals (e.g., daily, hourly, etc.), for example. When a batch is retrieved, a document handler 510 may signal INT MGR 501 to trigger a GET request. The GET request may include a document type, for example, as mentioned above, so that only a particular type of documents are retrieved (e.g., expense reports, invoices, or cash advances). In response to the GET request from INT MGR 501, documents from the cloud system are stored in a storage system, which in this example is a JSON document store 502. Storage calls, such as save, read, etc. are managed by a document store manager class 503. Documents in the store are retrieved by document store manager 503. When documents are successfully received, integration manager 501 may generate a POST acknowledgement as described above.

Document store manager 503 may be coupled to a JSON parser 505 and/or an ABAP converter 506. JSON parser 505 parses the JSON objects and maps the data in the objects to fields of local object for local processing. ABAP converter 506 may convert specific data fields in the JSON objects into formats understandable by the ABAP programming language, for example. Document store manager 503 may be coupled to a lock handler class 504 for locking documents in data store 502 that are being processed so multiple processes cannot access and process a document at the same time, for example.

A status handler 520 is coupled to the document store manager 503 to set a status of the documents during processing, for example, as describe above in FIG. 3. Status handler 520 sets the status of each document to one of a plurality of predefined status indicators arranged sequentially, where a next status is based on a current status as described above.

In this example, document handler 510 has a document handler type 507 sub-class for each document type ("DOC_HANDLER_TYPE"). Document handler type 507 receives the information for each document and further receives configuration information for handling specific documents. Document handler type 507 reads and configures data from each document and prepares the documents to have particular transaction processing performed on them (e.g., posting in a financial system). For example, document handler type 507 may determine which user or organization account information to use in processing a document. This may include, in some cases, mapping cloud system accounts to backend system accounts, for example. Document handler type 507 may determine an effective date for a transaction. For example, if the transaction is a "financial post", then it may be necessary to determine a posting date from a number of possible dates related to the document. As mentioned above, there may be different classes and object instances of document handler type 507 for different document types—e.g., one class for expense reports, one class for invoices, and one class for cash advances. Accordingly, different document types may be prepared for transaction processing in ways that are unique to each document type.

Transaction handler 511 receives information from document handler type 507. Transaction handler may also have different classes for different document types. For example, for a "financial post" transaction, transaction handler 511 may have a POST HANDLER ER class for expense reports, a POST HANDLER INV class for invoices, and POST HANDLER CA class for cash advances, for example. Transaction handle 511 includes high level logic for overall coordination of the transaction, and may access the document status from status handler 520, document data and configuration data, and lock handler, for example.

Process transaction block 512 may perform the transaction, such as a financial post, for example. Process transaction 512 may be a helper class which may coordinate different processing of different types of documents. For example, posting an expense report may require a different process flow than posting an invoice or a cash advance. Process transaction block 512 may perform one process flow to post an expense report document, another process flow to post an invoice, and yet another process flow to post a cash advance, for example. As transactions are processed data is stored in backend document store 513. If the transaction is successful, then the process transaction block may cause integration manager 501 to generate a REST HTTP POST message to the cloud system as described above. Similarly, if additional transactions are performed using a document received from the cloud system, then additional POST messages may be generated by integration manager 501 as described above. Accordingly, using the architecture shown in FIG. 5, data from a cloud system may be successfully integrated into a backend system.

Figure 6:
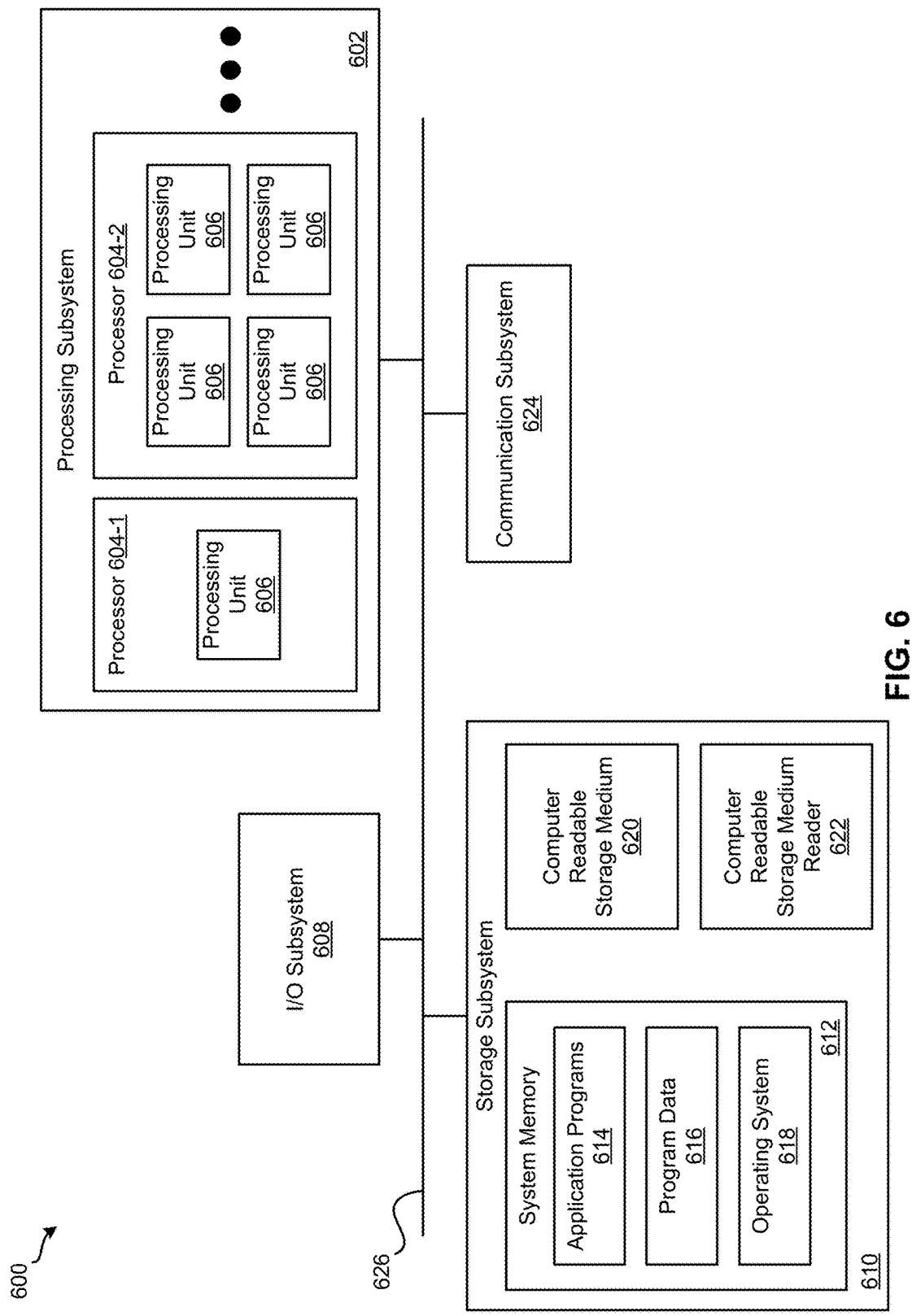
FIG. 6 illustrates an exemplary computer system, in which various embodiments may be implemented.

FIG. 6 illustrates an exemplary computer system 600, in which various embodiments may be implemented. For example, computer system 600 may be used to implement cloud or backend computing systems 101 or 102, for example. In addition, computer system 600 can implement many of the operations, methods, and/or processes described above. As shown in FIG. 6, computer system 600 includes processing subsystem 602, which communicates, via bus subsystem 602, with input/output (I/O) subsystem 608, storage subsystem 610 and communication subsystem 624.

Bus subsystem 602 is configured to facilitate communication among the various components and subsystems of computer system 600. While bus subsystem 602 is illustrated in FIG. 6 as a single bus, one of ordinary skill in the art will understand that bus subsystem 602 may be implemented as multiple buses. Bus subsystem 602 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 602, which can be implemented as one or more integrated circuits (e.g., a conventional microprocessor or microcontroller), controls the operation of computer system 600. Processing subsystem 602 may include one or more processors 604. Each processor 604 may include one processing unit 606 (e.g., a single core processor such as processor 604-1) or several processing units 606 (e.g., a multicore processor such as processor 604-2). In some embodiments, processors 604 of processing subsystem 602 may be implemented as independent processors while, in other embodiments, processors 604 of processing subsystem 602 may be implemented as multiple processors integrate into a single chip or multiple chips. Still, in some embodiments, processors 604 of processing subsystem 602 may be implemented as a combination of independent processors and multiple processors integrated into a single chip or multiple chips.

In some embodiments, processing subsystem 602 can execute a variety of programs or processes in response to program code and can maintain multiple concurrently executing programs or processes. At any given time, some or all of the program code to be executed can reside in processing subsystem 602 and/or in storage subsystem 610. Through suitable programming, processing subsystem 602 can provide various functionalities, such as the functionalities described above.

I/O subsystem 608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 600 to a user or another device (e.g., a printer).

As illustrated in FIG. 6, storage subsystem 610 includes system memory 612, computer-readable storage medium 620, and computer-readable storage medium reader 622. System memory 612 may be configured to store software in the form of program instructions that are loadable and executable by processing subsystem 602 as well as data generated during the execution of program instructions. In some embodiments, system memory 612 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 612 may include different types of memory, such as static random access memory (SRAM) and/or dynamic random access memory (DRAM). System memory 612 may include a basic input/output system (BIOS), in some embodiments, that is configured to store basic routines to facilitate transferring information between elements within computer system 600 (e.g., during start-up). Such a BIOS may be stored in ROM (e.g., a ROM chip), flash memory, or any other type of memory that may be configured to store the BIOS.

As shown in FIG. 6, system memory 612 includes application programs 614, program data 616, and operating system (OS) 618. OS 618 may be one of various versions of Microsoft Server operating systems, and/or Linux operating systems, a variety of commercially-available UNIX or UNIX-like operating systems (including without limitation the variety of GNU/Linux operating systems, the Google Chrome® OS, and the like).

Computer-readable storage medium 620 may be a non-transitory computer-readable medium configured to store software (e.g., programs, code modules, data constructs, instructions, etc.). Many of the components and/or processes described above may be implemented as software that when executed by a processor or processing unit (e.g., a processor or processing unit of processing subsystem 602) performs the operations of such components and/or processes. Storage subsystem 610 may also store data used for, or generated during, the execution of the software.

Storage subsystem 610 may also include computer-readable storage medium reader 622 that is configured to communicate with computer-readable storage medium 620. Together and, optionally, in combination with system memory 612, computer-readable storage medium 620 may comprehensively represent remote, local, fixed, and/or removable storage devices plus storage media for temporarily and/or more permanently containing, storing, transmitting, and retrieving computer-readable information.

Computer-readable storage medium 620 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 624 serves as an interface for receiving data from, and transmitting data to, other devices, computer systems, and networks. For example, communication subsystem 624 may allow computer system 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 624 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 624 may provide components configured for wired communication (e.g., Ethernet) in addition to or instead of components configured for wireless communication.

One of ordinary skill in the art will realize that the architecture shown in FIG. 6 is only an example architecture of computer system 600, and that computer system 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
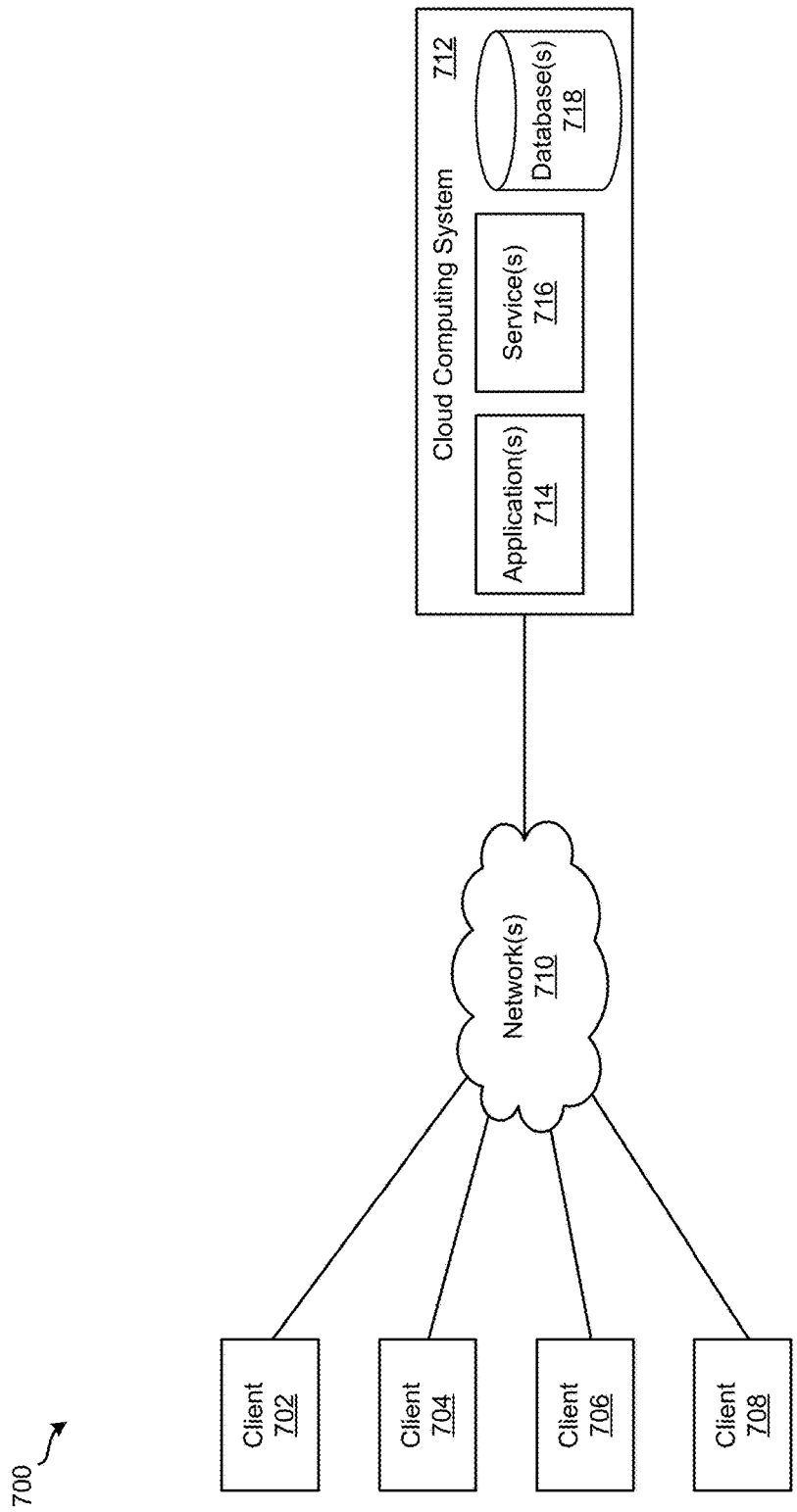
FIG. 7 illustrates a system for implementing various embodiments described above.

FIG. 7 illustrates system 700 for implementing various embodiments described above. For example, applications 714 and/or services 716 of system 700 may be used to implement master data manager 115 and/or supplier network manager 150. As shown, system 700 includes client devices 702-708, one or more networks 710, and cloud computing system 712. Cloud computing system 712 is configured to provide resources and data to client devices 702-708 via networks 710. In some embodiments, cloud computing system 700 provides resources to any number of different users (e.g., customers, tenants, organizations, etc.). Cloud computing system 712 may be implemented by one or more computer systems (e.g., servers), virtual machines operating on a computer system, or a combination thereof.

As shown, cloud computing system 712 includes one or more applications 714, one or more services 716, and one or more databases 718. Cloud computing system 700 may provide applications 714, services 716, and databases 718 to any number of different customers in a self-service, subscription-based, elastically scalable, reliable, highly available, and secure manner.

In some embodiments, cloud computing system 700 may be adapted to automatically provision, manage, and track a customer's subscriptions to services offered by cloud computing system 700. Cloud computing system 700 may provide cloud services via different deployment models. For example, cloud services may be provided under a public cloud model in which cloud computing system 700 is owned by an organization selling cloud services and the cloud services are made available to the general public or different industry enterprises. As another example, cloud services may be provided under a private cloud model in which cloud computing system 700 is operated solely for a single organization and may provide cloud services for one or more entities within the organization. The cloud services may also be provided under a community cloud model in which cloud computing system 700 and the cloud services provided by cloud computing system 700 are shared by several organizations in a related community. The cloud services may also be provided under a hybrid cloud model, which is a combination of two or more of the aforementioned different models.

In some instances, any one of applications 714, services 716, and databases 718 made available to client devices 702-708 via networks 710 from cloud computing system 700 is referred to as a "cloud service." Typically, servers and systems that make up cloud computing system 700 are different from the on-premises servers and systems of a customer. For example, cloud computing system 700 may host an application and a user of one of client devices 702-708 may order and use the application via networks 710.

Applications 714 may include software applications that are configured to execute on cloud computing system 712 (e.g., a computer system or a virtual machine operating on a computer system) and be accessed, controlled, managed, etc. via client devices 702-708. In some embodiments, applications 714 may include server applications and/or mid-tier applications (e.g., HTTP (hypertext transport protocol) server applications, FTP (file transfer protocol) server applications, CGI (common gateway interface) server applications, JAVA server applications, etc.) Services 716 are software components, modules, application, etc. that are configured to execute on cloud computing system 712 and provide functionalities to client devices 702-708 via networks 710. Services 716 may be web-based services or on-demand cloud services.

Databases 718 are configured to store and/or manage data that is accessed by applications 714, services 716, and/or client devices 702-708. Databases 718 may reside on a non-transitory storage medium local to (and/or resident in) cloud computing system 712, in a storage-area network (SAN), on a non-transitory storage medium local located remotely from cloud computing system 712. In some embodiments, databases 718 may include relational databases that are managed by a relational database management system (RDBMS). Databases 718 may be a column-oriented databases, row-oriented databases, or a combination thereof. In some embodiments, some or all of databases 718 are in-memory databases. That is, in some such embodiments, data for databases 718 are stored and managed in memory (e.g., random access memory (RAM)).

Client devices 702-708 are configured to execute and operate a client application (e.g., a web browser, a proprietary client application, etc.) that communicates with applications 714, services 716, and/or databases 718 via networks 710. This way, client devices 702-708 may access the various functionalities provided by applications 714, services 716, and databases 718 while applications 714, services 716, and databases 718 are operating (e.g., hosted) on cloud computing system 700. Although system 700 is shown with four client devices, any number of client devices may be supported.

Networks 710 may be any type of network configured to facilitate data communications among client devices 702-708 and cloud computing system 712 using any of a variety of network protocols. Networks 710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure and as defined by the claims.

What is claimed is:

1. A method comprising:
   specifying, on a first computer system, a document includes required data and is ready for external processing by a second computer system including a processing step;
   accessing, on the first computer system, data associated with the document from a first database;
   storing the data associated with the document in a queue;
   receiving, from a second computer system, a first request for the document;
   sending the data associated with the document from the first computer system to the second computer system in response to the first request;
   receiving, from the second computer system, an acknowledgement message indicating that the data associated with the document was received;

receiving, from the second computer system, a status confirmation message indicating a status of the processing step being performed on the document by the second computer system, the status either confirming successful completion of the processing step or indicating unsuccessful completion of the processing step;
receiving from the second computer system, a second request to further process the document; and
recalling by the first computer system, the document from the queue in response to the second request,
wherein once the acknowledgement message has been received, the data associated with the document cannot be recalled from the queue until after the status confirmation message is received from the second computer system.

2. The method of claim 1 further comprising appending a document type and a document identification to the document when the document is stored in the queue, wherein the request comprises a document type to be retrieved, and all documents in the queue having the document type are returned to the second computer system in response to the request.

3. The method of claim 1 wherein the data associated with the document is stored in the queue as a JSON object.

4. The method of claim 1 wherein the data associated with the document is stored in the first database in a plurality of tables.

5. The method of claim 1 wherein the request for the document is a GET.

6. The method of claim 1 wherein the storing and retrieving are performed asynchronously.

7. The method of claim 1 wherein the acknowledgement message and the status confirmation message are first and second POSTs.

8. The method of claim 1 wherein the first computer system is a cloud computer system and the second computer system is a backend computer system.

9. The method of claim 1 wherein the status indicates an error.

10. A cloud computer system comprising:
a set of processing units; and
a non-transitory computer-readable medium storing instructions that when executed by at least one processing unit in the set of processing units cause the at least one processing unit to:
specify, on the cloud computer system, a document associated with a particular transaction includes required data and has been approved for external processing by a backend computer system including a processing step;
access, on the cloud computer system, data associated with the document from a plurality of tables in a transactional database;
store the data associated with the document in a queue together as a JSON object;
asynchronously from the store step, receive, from a backend computer system, a GET request for the document, and retrieve the JSON object from the cloud computer system to the backend computer system in response to the GET request;
receive, from the backend computer system, a first POST generated by the backend computer system acknowledging that the JSON object was received;
receive, from the backend computer system, a second POST generated by the backend computer system indicating a status of the processing step being performed on the document by the backend computer system, the status either confirming successful completion of processing step or indicating unsuccessful completion of the processing step;
receive from the backend computer system, a request to further process the document; and
recall by the cloud computer system, the document from the queue in response to the request to further process the document,
wherein once the first POST has been received, the JSON object cannot be recalled from the queue until after the second POST has been received.

11. The system of claim 10 further comprising appending a document type and a document identification to the JSON object when the JSON object is stored in the queue, wherein the GET comprises a document type to be retrieved, and a plurality of JSON objects in the queue having the document type are returned to the backend computer system in response to the GET.

12. The system of claim 10 wherein the status indicates an error.

13. A non-transitory machine-readable medium storing a program executable by at least one processing unit of a device, the program comprising sets of instructions for:
specifying, on a first computer system, a document includes required data and is ready for external processing by a second computer system including a processing step;
accessing, on the first computer system, data associated with the document from a first database;
storing the data associated with the document in a queue;
receiving, from a second computer system, a first request for the document, and sending the data associated with the document from the first computer system to the second computer system in response to the first request;
receiving, from the second computer system, an acknowledgement message indicating that the data associated with the document was received;
receiving, from the second computer system, a status confirmation message indicating a status of the processing step being performed on the document by the second computer system, the status either confirming successful completion of the processing step or indicating unsuccessful completion of the processing step;
receiving from the second computer system, a second request to further process the document; and
recalling by the first computer system, the document from the queue in response to the second request,
wherein once the acknowledgement message has been received, the data associated from the document cannot be recalled from the queue until after the status confirmation message is received from the second computer system.

14. The non-transitory machine-readable medium of claim 13 further comprising appending a document type and a document identification to the document when the document is stored in the queue, wherein the request comprises a document type to be retrieved, and all documents in the queue having the document type are returned to the second computer system in response to the request.

15. The non-transitory machine-readable medium of claim 13 wherein the data associated with the document is stored in the queue as a JSON object.

16. The non-transitory machine-readable medium of claim 13 wherein the data associated with the document is stored in the first database in a plurality of tables.

17. The non-transitory machine-readable medium of claim 13 wherein the request for the document is a GET.

18. The non-transitory machine-readable medium of claim 13 wherein the storing and retrieving are performed asynchronously.

19. The non-transitory machine-readable medium of claim 13 wherein the acknowledgement message and the status confirmation message are first and second POSTs.

20. The non-transitory machine-readable medium of claim 13 wherein the status indicates an error.

\* \* \* \* \*